United States Patent
Aldred et al.

(10) Patent No.: US 6,493,764 B1
(45) Date of Patent: Dec. 10, 2002

(54) DATA COMMUNICATIONS APPARATUS, METHOD AND COMPUTER PROGRAM PRODUCT IMPLEMENTING DATA COMMUNICATIONS PROTOCOL WITH EFFICIENT PACKING OF DATAGRAMS

(75) Inventors: Barry Keith Aldred, Winchester (GB); Paul A Beaven, Romsey (GB); Davin Morris Coleman, Tonbridge (GB); Brian Phillip Ernest Fisk, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/349,046

(22) Filed: Jul. 7, 1999

(30) Foreign Application Priority Data

Jul. 8, 1998 (GB) ............................................ 9814669

(51) Int. Cl.⁷ .............................................. G06F 15/16
(52) U.S. Cl. ...................... 709/236; 709/203; 709/232; 709/234; 709/236; 370/310; 370/470; 370/471; 370/472; 370/476; 370/477
(58) Field of Search ................................ 709/224, 227, 709/230, 236, 232, 234, 203; 370/310, 346, 351–352, 392, 394, 389, 398, 409, 363, 465, 477; 703/26

(56) References Cited

U.S. PATENT DOCUMENTS

| | | | | |
|---|---|---|---|---|
| 5,461,627 A | * | 10/1995 | Rypinski ..................... | 370/346 |
| 5,526,353 A | * | 6/1996 | Henley et al. ............... | 370/392 |
| 5,537,401 A | * | 7/1996 | Tadamura et al. .......... | 370/409 |
| 5,572,678 A | * | 11/1996 | Homma et al. ............. | 709/227 |
| 5,581,743 A | * | 12/1996 | Burton et al. ................ | 703/26 |
| 5,680,400 A | * | 10/1997 | York .......................... | 370/465 |
| 5,781,549 A | * | 7/1998 | Dai .............................. | 370/398 |
| 5,802,311 A | * | 9/1998 | Wronski ...................... | 709/236 |
| 5,841,764 A | * | 11/1998 | Roderique et al. .......... | 370/310 |
| 5,850,526 A | * | 12/1998 | Chou .......................... | 370/477 |
| 5,923,655 A | * | 7/1999 | Veschi et al. ............... | 370/394 |
| 6,105,064 A | * | 8/2000 | Davis et al. ................. | 709/224 |
| 6,111,924 A | * | 8/2000 | McKinley .................... | 375/354 |
| 6,141,338 A | * | 10/2000 | Tadamura ................... | 370/352 |
| 6,226,680 B1 | * | 5/2001 | Boucher et al. ............. | 709/230 |
| 6,246,684 B1 | * | 6/2001 | Chapman et al. ............ | 370/363 |
| 6,259,690 B1 | * | 7/2001 | Yoshizawa et al. ......... | 370/351 |
| 6,262,983 B1 | * | 7/2001 | Yoshizawa et al. ......... | 370/389 |
| 6,269,402 B1 | * | 7/2001 | Lin et al. .................... | 709/227 |

FOREIGN PATENT DOCUMENTS

| | | | | |
|---|---|---|---|---|
| GB | 2314740 A | 1/1998 | | |
| JP | 233951 | 10/1987 | ........... | H04L/13/00 |
| JP | 6481551 | 3/1989 | ........... | H04L/11/20 |
| JP | 7177176 | 7/1995 | ........... | H04L/12/56 |
| JP | 0712311 | 12/1995 | ........... | H04L/13/08 |
| JP | 823353 | 1/1996 | ........... | H04L/23/00 |
| JP | 9008841 | 10/1997 | ........... | H04L/12/54 |

* cited by examiner

Primary Examiner—Ayaz Sheikh
Assistant Examiner—Thu Ha Nguyen
(74) Attorney, Agent, or Firm—Jerry W. Herndon

(57) ABSTRACT

A data communications apparatus connected to a network through which datagrams flow from the data communications apparatus to at least one other data communications apparatus also connected to the network, the apparatus having: a means for receiving data which is to be transmitted over the network, such data being broken up into data records; and a means for packing the data records into datagrams for transmission over the network, including a means for assigning data records to datagrams; wherein the means for packing takes the data records out of sequential order when assigning data records to datagrams.

8 Claims, 3 Drawing Sheets

DATA COMMUNICATIONS APPARATUS, METHOD AND COMPUTER PROGRAM PRODUCT IMPLEMENTING DATA COMMUNICATIONS PROTOCOL WITH EFFICIENT PACKING OF DATAGRAMS

FIELD OF THE INVENTION

The present invention relates to protocols (i.e., sets of rules) for the communication of digital data between a sender and receiver (e.g., the sender and receiver are computer systems located at different physical locations).

BACKGROUND OF THE INVENTION

The usual form of digital data communication involves sending such digital data in the form of datagrams over a network. See, e.g., Computer Networks by Andrew S. Tanenbaum, Prentice-Hall Inc., Englewood Cliffs, N.J. 1981. A datagram is a group of bits representing a portion of the digital data to be transmitted and each datagram is treated individually by the network. Thus, if a large amount of data is to be transmitted from a sender data processing unit to a receiver data processing unit, the sender data processing unit breaks up the large amount of data into smaller sized blocks (called data records hereinbelow) and packs these records into datagrams for transmission over a data communications network to the receiver data processing unit. The datagrams which are being sent over the network range in size from 1 to some fixed number (say n) bytes. The data records which are to be packed into the datagrams also may range in size from 1 to some other fixed number (say m) bytes.

Whenever a datagram is sent over the network, there are various overheads associated with such transmission. Firstly, it takes time to process each datagram at the sending and receiving ends. This time is split into two components: a fixed amount per each datagram and an amount proportional to the size of the datagram. The fixed amount is usually significantly greater than the variable amount. Secondly, each datagram must have extra data associated with it (address information etc.) which involves a fixed amount of extra data to be added to each datagram. Due to such overheads, it is therefore inefficient to send small datagrams over the network.

The usual technique for packing data records into datagrams involves taking the data records in sequential order. For example, a list of variable length data records of lengths 200 bytes, 250 bytes, 100 bytes and 50 bytes are to be packed into a plurality of 512-byte datagrams. The first two records can be packed into the first datagram (because 200 bytes plus 250 bytes will fit in a 512 byte datagram). However, the next data record (of 100 bytes) will not fit (because 450 plus 100 will be greater than the 512 byte capacity of a datagram). Thus, the 100 byte record will have to be packed into the next datagram.

The problem with this prior technique, however, is that there is some space left over in the first datagram which has not been utilized. Thus, the overheads discussed above are incurred without obtaining as much data transmission as would otherwise be possible. Further, when certain communications networks are used, such as mobile networks, transmission time can be very expensive, so it is highly advantageous to flow as few datagrams as possible over the network with as much data as possible packed into each datagram. Thus, the present state of the art in this area results in an inefficient and potentially very expensive systems architecture.

SUMMARY OF THE INVENTION

According to a first aspect, the invention provides a data communications apparatus connected to a network through which datagrams flow from the data communications apparatus to at least one other data communications apparatus also connected to the network, the apparatus having: a means for receiving data which is to be transmitted over the network, such data being broken up into data records; and a means for packing the data records into datagrams for transmission over the network, including a means for assigning data records to datagrams; wherein the means for packing takes the data records out of sequential order when assigning data records to datagrams.

Preferably, the means for packing assigns, to a datagram presently being packed, the largest unassigned data record that will fit in the datagram.

Preferably, the means for assigning considers only one datagram at a time when assigning data records to datagrams. However, alternatively, the means for assigning considers a plurality of datagrams at a time when assigning data records to datagrams.

Preferably, the size of each data record must be less than or equal to the size of each datagram. However, alternatively, the size of a data record is larger than the size of a datagram.

According to a second aspect, the invention provides a method of carrying out the functions recited with respect to the first aspect.

According to a third aspect, the invention provides a computer program product stored on a computer readable storage medium, for when running on a computing system, carrying out the functions recited with respect to the first aspect of the invention.

Thus, by taking data records out of sequential order when assigning data records to datagrams and thereby packing as much data as possible into each datagram before transmission, a highly efficient use of the communications overhead is possible. This presents a very large cost savings, especially where the network is a wireless one, where it is expensive (as compared to wired networks) to transmit each datagram.

BRIEF DESCRIPTION OF THE DRAWINGS

A preferred embodiment of the present invention will now be explained in detail with reference to the following figures, through which the invention can be better understood.

DETAILED DESCRIPTION OF THE PREFERRED EMBODIMENTS

Figure 1:
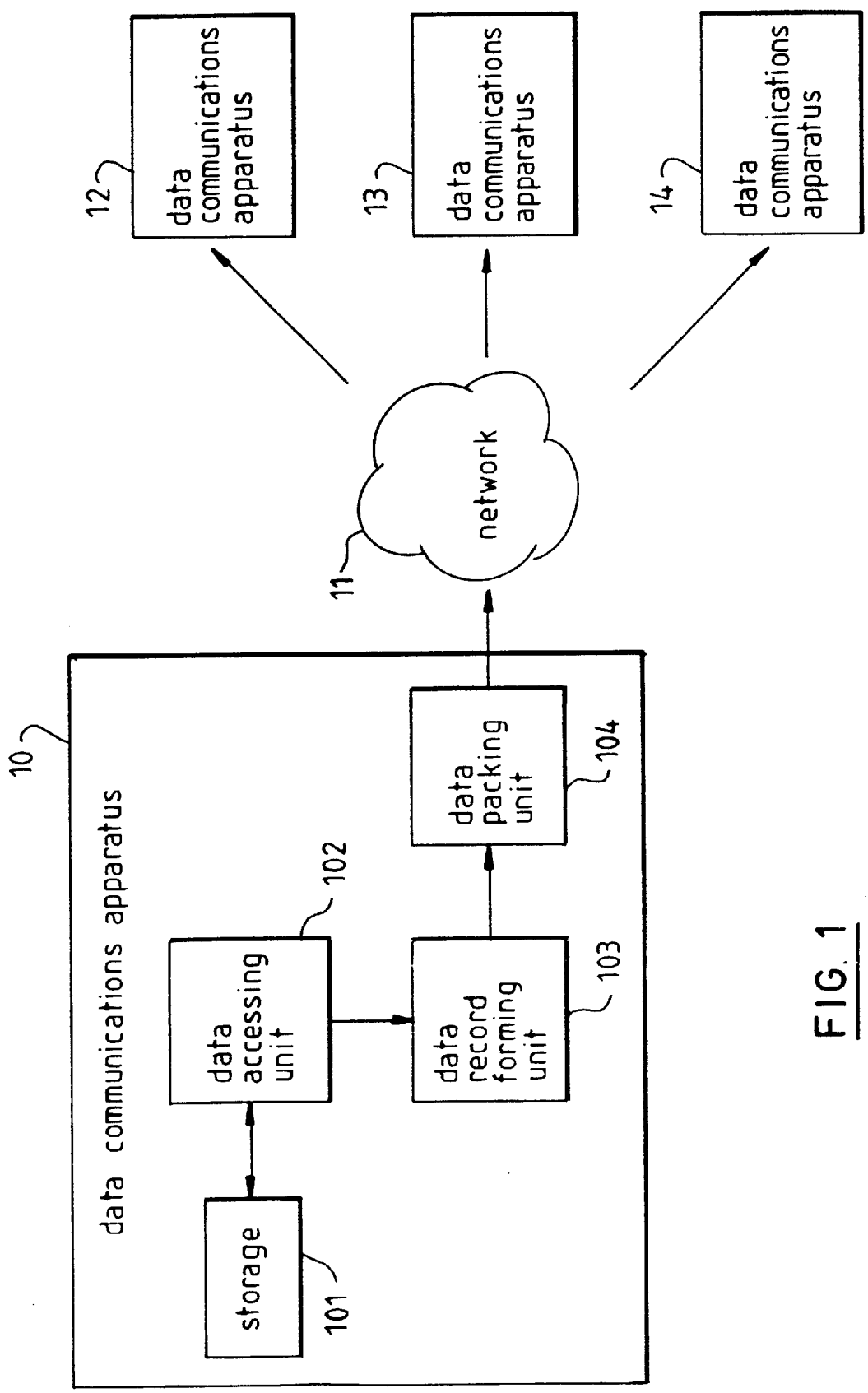
FIG. 1 is a block diagram of a plurality of data communications devices connected to a network, and it is in this context in which the preferred embodiment of the present invention will be described.

As shown in FIG. 1, a data communications apparatus 10 (which could be a personal computer) is connected to a network 11 (which could be the Internet or any other network for connecting data communications equipment). Also connected to network 11 are other data communications apparatus 12, 13 and 14. Each data communications apparatus can communicate with other data communications apparatus by sending data over the network 11.

Data communications apparatus 10 is shown in more detail and it will be assumed in the following discussion that this apparatus 10 is sending data to at least one other data communications apparatus (12, 13 and/or 14). Apparatus 10 includes a storage unit 101 for storing data which is to be transmitted by the apparatus 10. This storage unit 101 could be a hard disk drive, floppy disk drive, semiconductor memory, or any other well known storage unit. A data accessing unit 102 selects which data is to be transmitted and accesses such data from the storage unit 101 and then passes the accessed data along to a data record forming unit 103. Data record forming unit 103 breaks the data up into data records of various sizes, e.g., some data records will be smaller in size than others. The data record forming unit 103 then sends the data records to the data packing unit 104 which packs the data records into datagrams (e.g., unit 104 takes the data records and assigns them to the network 11's native data transmission unit, which is herein called a datagram).

The function carried out by the data packing unit 104 when the unit 104 is supplied with data records from the data record forming unit 103 will now be described in conjunction with the flowchart of FIG. 2. However, first a source code version of the functionality will be given in order to clearly illustrate such functionality:

```
WHILE (data_records_to_send) DO
    available_space=datagram_size;
    WHILE (available_space>smallest data record left) DO
        get largest data record that will fit;
        available_space=available_space—size of (data_record);
    ENDWHILE;
    send datagram;
ENDWHILE;
```

Figure 2:
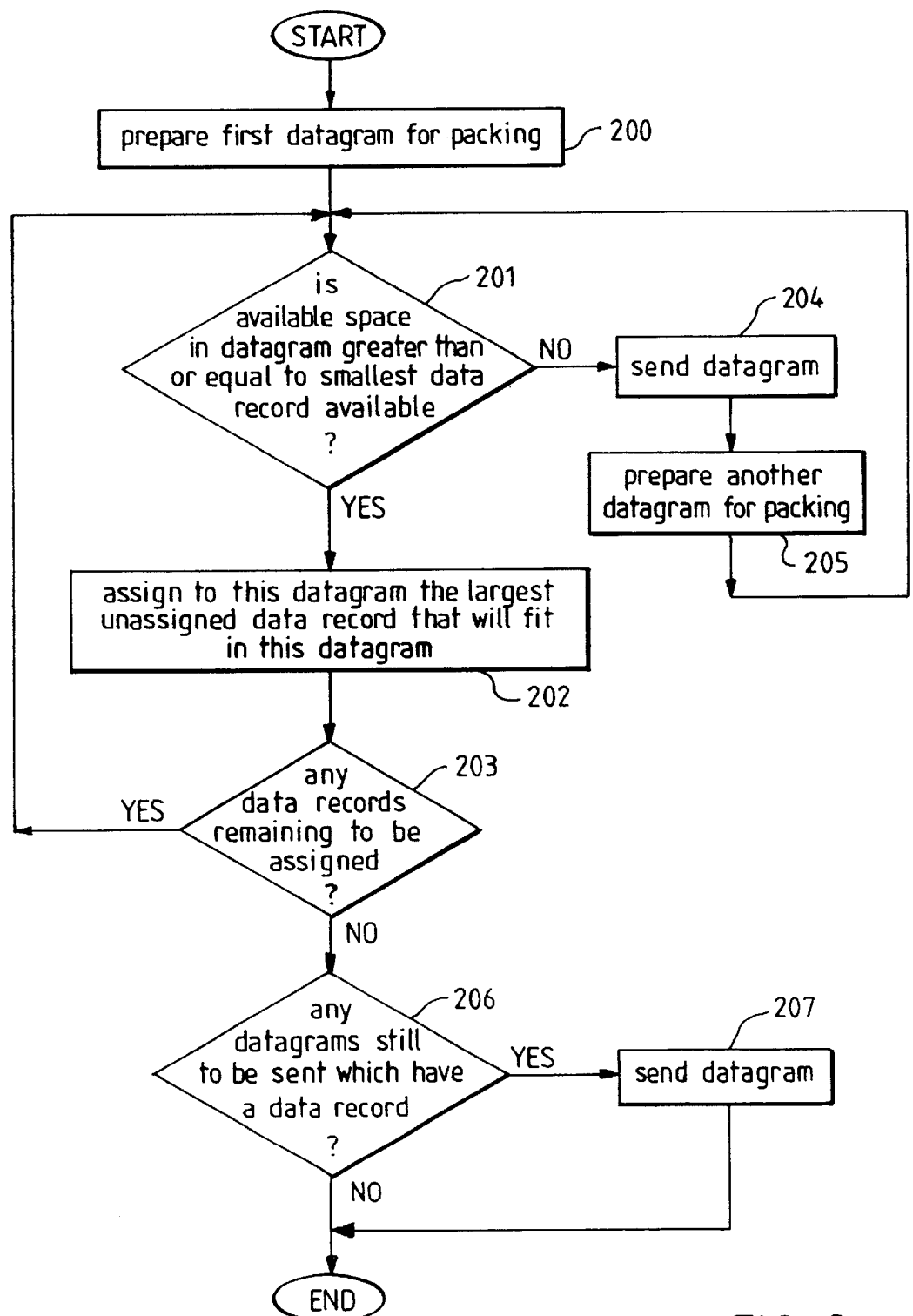
FIG. 2 is a flowchart illustrating the steps involved in packing data records into datagrams, according to a preferred embodiment of the present invention.

In FIG. 2, the process of packing data records into a first datagram begins. At step 200, a first datagram is prepared for packing (i.e., the data packing unit 104 concentrates on a first datagram which it will now assign data records to). It is determined at step 201 whether the available space in this first datagram (e.g., part of the datagram in which data records have not yet been written) is greater than or equal to the smallest data record that has not yet been assigned to a datagram. That is, it is determined whether there is still room to fit another data record into this first datagram. If the answer is YES, then control proceeds to step 202 where the largest unassigned data record that will fit in the available space in the first datagram is assigned to the first datagram. If the answer is NO at step 201, then control flows to step 204, where the first datagram is sent out of the data packing unit 104 and further out onto the network 11 for transmission to a receiving apparatus (e.g. 12). In this latter case, there is no room left in this datagram to pack in any more of the data records so the datagram is sent out over the network 11. After step 204 is carried out, control flows to step 205 where a second datagram is prepared for packing, and then control flows back to step 201.

Once step 202 is carried out, control flows to step 203 where it is determined whether there are any remaining data records which are still waiting to be assigned to a datagram. If YES, then control loops back to step 201. If NO, then control flows to step 206 where it is determined whether there are any datagrams which have at least one data record packed therein but which has not yet been sent out over the network 11. If YES, then such a datagram is sent out over the network at step 207 and then the flow of control ends. If NO, then the flow of control ends.

An example will now be taken up, in order to provide an even clearer understanding of the functionality involved within the data packing unit 104 of the preferred embodiment of the present invention. In the example, the data accessing unit 102 accesses, from storage unit 101, a data collection consisting of 81 bytes. These 81 bytes are to be transmitted from the data communications apparatus 10 to another data communications apparatus 13 over the network 11.

Figure 3:
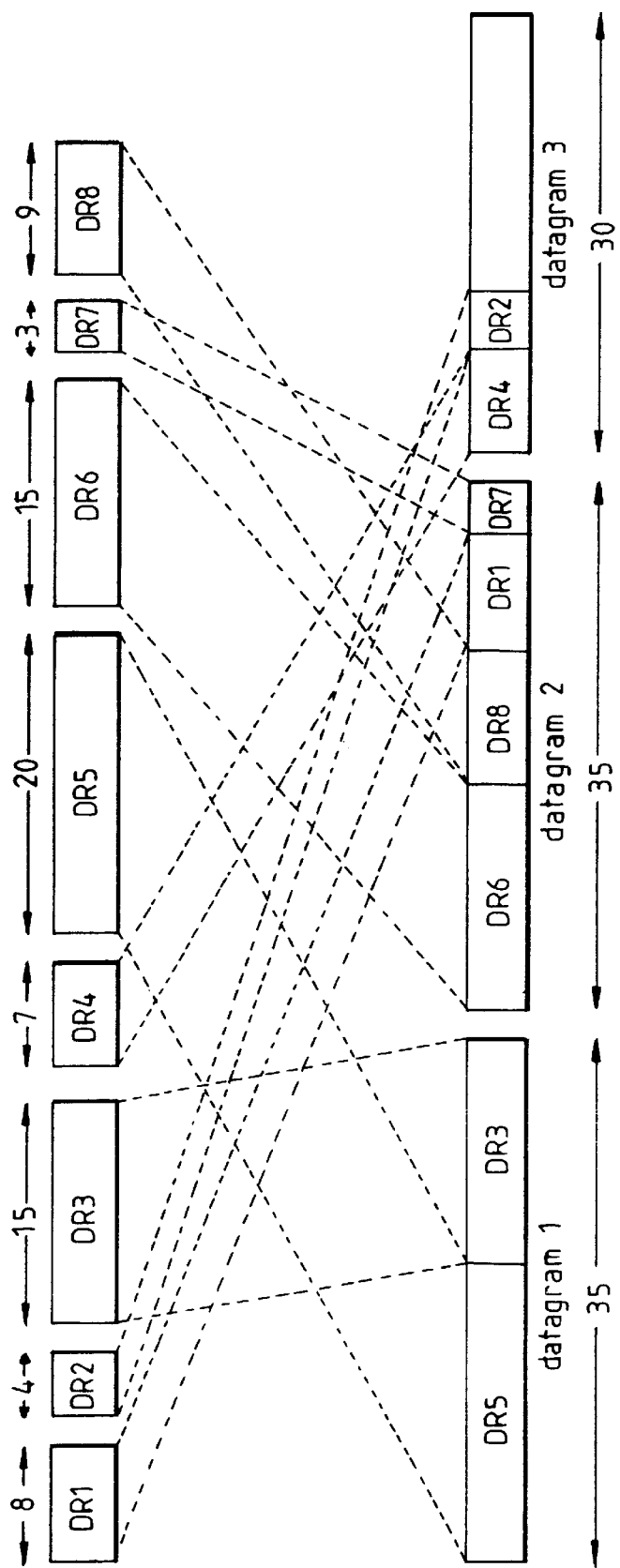
FIG. 3 illustrates an example of the data packing carried out according to a preferred embodiment of the present invention.

The data accessing unit 102 transfers the 81 byte data collection to the data record forming unit 103 which breaks up the collection into 8 data records DR1 through DR8 of various sizes, as shown near the top of FIG. 3. The first data record, DR1, represents the first 8 bytes of the 81 byte collection. The second data record, DR2, represents the next 4 bytes of the 81 byte collection. The third data record, DR3, represents the next 7 bytes of the 81 byte data collection. This pattern continues up to the last data record DR8 which represents the last 9 bytes of the 81 byte data collection.

The data record forming unit 103 then forwards these eight data records DR1 to DR8 on to the data packing unit 104 which will pack the data records DR1 to DR8 into datagrams for transmission over the network 11. For a first datagram (datagram 1, near the bottom of FIG. 3) of 35 bytes in length, control begins at step 201 where it is determined that there is plenty of available space left in datagram 1 (since there has yet been no data records packed in datagram 1) and thus the YES branch is taken. At step 202, the largest unassigned data record, e.g. DR5 of 20 bytes in length, is assigned to datagram 1. At step 203, it is determined that there are still seven other data records which need to be packed so control loops back to step 201.

At step 201, it is determined that the available space in datagram 1 is 15 bytes (e.g., 35 bytes minus 20 bytes equals 15 bytes) and that this 15 bytes is greater than the smallest data record available (which is DR7 having a 3 byte length). Therefore, control flows to step 202, where the largest unassigned data record that will fit in the datagram is assigned to datagram 1. In this case, since 15 bytes is available in datagram 1, DR3, having a length of 15 bytes, is the largest available datagram that will fit in datagram 1, so DR3 is assigned to datagram 1. Then control flows to step 202 where it is determined that there are still data records remaining to be assigned, so control flows back to step 201.

This time, at step 201, it is determined that the available space in datagram 1 is NOT greater than or equal to the smallest data record available (because there is no available space left in datagram 1 and 0 bytes is NOT greater than or equal to 3 bytes). Thus, control flows to step 204 where datagram 1 is sent over network 11 to data communications apparatus 13. Then, control flows to step 205 where another datagram, datagram 2 (which also has a 35 byte length) is prepared for packing. Control then returns to step 201, where it is determined whether the available space in datagram 2 is greater than the smallest data record available. In this case, the answer is YES since the whole 35 bytes of datagram 2 is available for data record packing, and thus control flows to step 202. At step 202, the largest unassigned data record (e.g., DR6 of 15 bytes) is assigned to datagram 2. At step 203, it is then determined that there are other data records remaining to be assigned, and thus control flows back to step 201.

At step 201, it is determined that the available space in datagram 2, which is 20 bytes (35 bytes minus 15 bytes is 20 bytes) is greater than the smallest data record available (DR7 of 3 bytes) since 20 bytes is greater than 3 bytes. Thus, control flows to step 202 where the largest unassigned data record (DR8 of 9 bytes length) is assigned to datagram 2. At step 203, since there are still data records to be assigned, control loops back to step 201.

At step 201, it is determined that the available space in datagram 2, which is 11 bytes (20 bytes minus 9 bytes is 11 bytes) is greater than the smallest data record available (DR7 of 3 bytes) since 11 bytes is greater than 3 bytes. Thus, control flows to step 202 where the largest unassigned data record (DR1 of 8 bytes length) is assigned to datagram 2. At step 203, since there are still data records to be assigned, control loops back to step 201.

At step 201, it is determined that the available space in datagram 2, which is 3 bytes (11 bytes minus 8 bytes is 3 bytes) is equal to the smallest data record available (DR7 of 3 bytes). Thus, control flows to step 202 where the largest unassigned data record that will fit (DR7 of 3 bytes length) is assigned to datagram 2. At step 203, since there are still data records to be assigned, control loops back to step 201.

This time, at step 201, it is determined that the available space in datagram 2 is NOT greater than or equal to the smallest data record available (because there is no available space left in datagram 2). Thus, control flows to step 204 where datagram 2 is sent over network 11 to data communications apparatus 13. Then, control flows to step 205 where another datagram, datagram 3 (having a length of 30 bytes) is prepared for packing. Control then returns to step 201.

At step 201, it is determined that the available space in datagram 3 (the entire 30 bytes) is greater than the smallest data record available (which is now DR2 of 4 bytes in length) and thus control flows to step 202 where the largest unassigned data record (e.g., DR4 of 7 bytes) is assigned to datagram 3. Control then flows to step 203 where it is determined that there is still one more data record (e.g., DR2) remaining to be assigned so control flows to step 201. At step 201, it is determined that the available space in datagram 3 is 23 bytes (30 bytes minus 7 bytes is 23 bytes) and this is greater than the smallest data record available (DR2 has 4 bytes) so control flows to step 202 where DR2 is assigned to datagram 3.

Now, at step 203, the NO branch is taken since there are no more data records remaining to be assigned. Control thus flows to step 206 where it is determined that there is a datagram (e.g., datagram 3) which has not yet been sent but which has been packed with at least one data record (e.g., DR4 and DR2). Thus, the YES branch is taken and control flows to step 207 where datagram 3 is sent over the network 11 to data communications apparatus 13, and finally the flow of control is ended.

The receiving data communications apparatus 13 need only remove each data record, in turn, from received datagrams and insert the data records into the correct place in a linked list of data records. The data can then be "streamed out" in the correct order in whatever sized pieces are appropriate. Accordingly, at the transmitting end, a small header should be added to each datagram and also to each data record within the datagram in order to identify the data contained. In many networks (such as the Internet) there is no guaranteed order of delivery of datagrams, and thus the receiving apparatus 13 need only check the datagram header to determine the proper order.

For large collections of data to be transmitted, the data record forming unit 103 could, preferably, group data records into bunches and pass a single bunch of data records at one time along to the data packing unit for packing into datagrams. The data packing unit would then carry out the flowchart of FIG. 2 on only the one bunch at a time. When a transmitted bunch of data records is received by a receiving data communications apparatus 13, apparatus 13 sends an acknowledgement back through the network 11 to the sending apparatus 10 to inform apparatus 10 that apparatus 13 has safely and correctly received the entire bunch of data records. In this case, a bit flag can be added to the last datagram in the bunch to indicate that it is the end of the bunch and that it should be acknowledged. This technique saves on the number of acknowledgements required when compared to a prior technique of sending a separate acknowledgement back for each datagram received.

Another embodiment of the present invention uses a similar flow chart to FIG. 2 but considers the space available in two (or more) datagrams when carrying out the packing. For example, step 201 determines whether the available space in a set of two datagrams is greater than or equal to the smallest data record available. In this way, data records larger than the datagram size can be handled and also data records (even small ones that could fit entirely in one datagram) can be made to span more than one datagram.

The data communications apparatus 10 having the described functional units has been described as the preferred embodiment. However, the invention also encompasses a data communications apparatus which does not have the storage unit, accessing unit and/or data record forming unit. For example, the data communications apparatus could receive, as an input, data records (already formed) to be transmitted. As another example, the data communications apparatus could receive, as an input, data which has already been accessed from storage but which still needs to be formed into records and packed into datagrams.

While in the preferred embodiment at step 202 the largest unassigned data record that will fit in the datagram presently being packed is selected, another embodiment could select some other criteria for determining the next candidate data record which will be checked to see if it will fit in the datagram (or data records could be taken at random and the only criteria would be whether the data record fits into the datagram).

We claim:

1. A data communications apparatus connected to a network through which datagrams flow from the data communications apparatus to at least one other data communications apparatus also connected to the network, the apparatus comprising:

means for receiving data which is to be transmitted over the network, such data being broken up into data records; and means for packing the data records into datagrams for transmission over the network, including a means for assigning data records to datagrams;

wherein the means for packing takes the data records out of sequential order when assigning data records to datagrams.

2. The apparatus of claim 1 wherein the means for packing assigns, to a datagram presently being packed, the largest unassigned data record that will fit in the datagram.

3. The apparatus of claim 1 wherein the means for assigning considers only one datagram at a time when assigning data records to datagrams.

4. The apparatus of claim 1 wherein the means for assigning considers a plurality of datagrams at a time when assigning data records to datagrams.

5. The apparatus of claim 1 wherein the size of each data record must be less than or equal to the size of each datagram.

6. The apparatus of claim 1 wherein the size of a data record is larger than the size of a datagram.

7. A data communications method of operating a data communications apparatus connected to a network through which datagrams flow from the data communications apparatus to at least one other data communications apparatus also connected to the network, the method comprising steps of:

receiving data which is to be transmitted over the network, such data being broken up into data records; and packing the data records into datagrams for transmission over the network, including assigning data records to datagrams;

wherein the packing step takes the data records out of sequential order when assigning data records to datagrams.

8. A computer program product stored on a computer readable storage medium for, when run on a computer, carrying out a data communications method of operating a data communications apparatus connected to a network through which datagrams flow from the data communications apparatus to at least one other data communications apparatus also connected to the network, the method comprising steps of:

receiving data which is to be transmitted over the network, such data being broken up into data records; and packing the data records into datagrams for transmission over the network, including assigning data records to datagrams;

wherein the packing step takes the data records out of sequential order when assigning data records to datagrams.

\* \* \* \* \*